(12) United States Patent
Pouradier

(10) Patent No.: US 8,005,579 B2
(45) Date of Patent: Aug. 23, 2011

(54) VEHICLE CONTROL DEVICE AND METHOD

(75) Inventor: Jean-Baptiste Pouradier, Montlhery (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 12/903,091

(22) Filed: Oct. 12, 2010

(65) Prior Publication Data

US 2011/0144830 A1 Jun. 16, 2011

Related U.S. Application Data

(63) Continuation of application No. 11/720,817, filed as application No. PCT/FR2005/051022 on Dec. 1, 2005, now abandoned.

(30) Foreign Application Priority Data

Dec. 2, 2004 (FR) .................................... 04 52841

(51) Int. Cl.
*G05D 3/00* (2006.01)

(52) U.S. Cl. .............................. 701/2; 701/36; 361/93.2

(58) Field of Classification Search ................ 701/2, 31, 701/32, 29, 36; 361/93.2, 93.9, 98, 104; 307/9.1, 10.6, 10.7
See application file for complete search history.

(56) References Cited

U.S. PATENT DOCUMENTS

| | | | |
|---|---|---|---|
| 4,942,571 A | 7/1990 | Moeller et al. | |
| 5,343,077 A | 8/1994 | Yoshida et al. | |
| 6,140,938 A | 10/2000 | Flick | |
| 6,157,091 A | 12/2000 | Yoshida et al. | |
| 7,282,810 B2 * | 10/2007 | Yoshida et al. | 307/9.1 |
| 7,737,575 B2 * | 6/2010 | Yamamoto et al. | 307/9.1 |
| 2003/0214392 A1 | 11/2003 | Flick | |

FOREIGN PATENT DOCUMENTS

| | | |
|---|---|---|
| DE | 40 42 451 | 3/1996 |
| EP | 0 800 254 | 10/1997 |

* cited by examiner

*Primary Examiner* — Richard M. Camby
(74) *Attorney, Agent, or Firm* — Oblon, Spivak, McClelland, Maier & Neustadt, L.L.P.

(57) ABSTRACT

A vehicle control device and method. To reduce consumption, the device and method test the state of each member used to input a command or interpret the wishes of the driver with the aid of a computer that is dedicated to each electricity-consuming resource. According to the device and method, when the engine is stopped, the accessories are no longer started up by pressing the start button.

3 Claims, 2 Drawing Sheets

VEHICLE CONTROL DEVICE AND METHOD

CROSS REFERENCE TO RELATED APPLICATION

This application is a Continuation application of U.S. Ser. No. 11/720,817, filed Jun. 4, 2007, which is a National Stage of French Priority Application No. PCT/FR05/51022, filed Dec. 1, 2005, the entire content of each of which is incorporated herein by reference in its entirety.

The present invention relates to a device and a method for controlling a vehicle.

In the state of the art, vehicle control devices and methods are already described, wherein the vehicle is activated by the use of a keyless access system.

Among the various known solutions, the existence of remote control or identification modules that exchange radio or infrared waves with an access controller set up on the vehicle is known.

The user of the vehicle carries such a module in the form of a badge or an identifier which exchanges information by a determined protocol so as to determine access to the vehicle and its various functions or resources.

Mainly as a result of vehicle control conventions inherited from the old technique in which a mechanical key was used both to unlock the doors of the vehicle on the one hand, and to initiate a vehicle start-up sequence on the other hand, combining the keyless access technique with the use of a start button is also proposed.

In order in particular to reproduce the traditional start-up sequences, it is proposed to use the start button as the main vehicle control unit, combined or not combined with pressing a brake pedal or a clutch pedal in order to differentiate the operation to start up the power train from other operations, particularly the powering up of the electrical accessories.

However, the user of the vehicle uses a start button that does not only control the power train.

On the contrary, the user then starts up all the electrical-energy-consuming resources which are, because of this, interlinked as a whole as will be explained later.

The present invention brings a solution to this drawback in the state of the art.

In practice, the preset invention relates to a vehicle control method of the type wherein access to the vehicle is controlled by a keyless access system.

According to the inventive method, each electricity-consuming resource of the vehicle is directly connected to a unit for controlling and/or interpreting the wishes of the driver, such that each resource associated with a control is independent of the other resources.

The invention also relates to a vehicle control device of the type comprising a keyless vehicle access controller.

According to another aspect of the invention, the step for starting up at least one electricity-consuming resource is preceded by a step for testing an authorization to access the vehicle.

The invention also relates to a vehicle control device which comprises, for each electricity-consuming function of the vehicle:

- a unit for entering controls or interpreting the wishes of the driver;
- a status transition computer for the control unit to call for electrical power from the onboard network; and
- a control actuator or effector responding to the status transition computer.

The accessories can no longer be started up, when the engine is stopped, by pressing the start button.

Other advantages and features of the invention will be better understood from the description and the appended figures in which:

FIG. 1 shows one exemplary embodiment of the state of the art, typically implemented in the type II RENAULT MEGANE vehicle.

Figure 1:
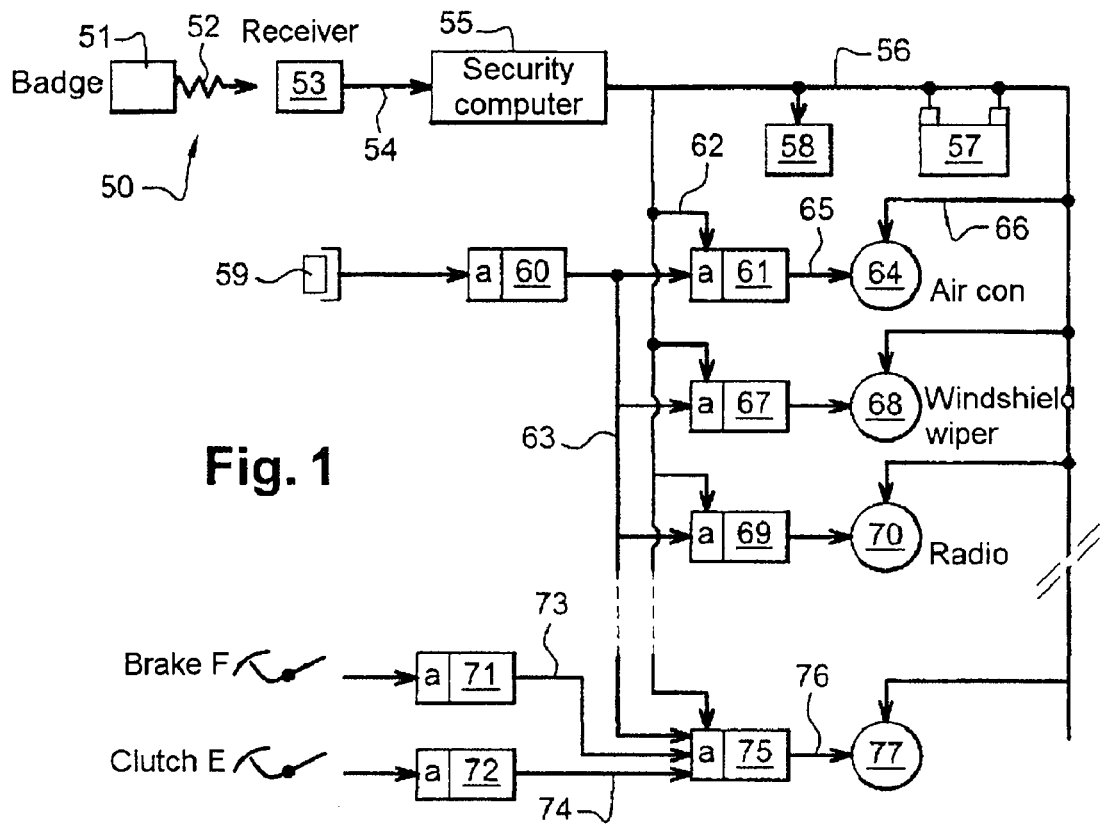
FIGS. 1 and 2 are diagrams representing the state of the art.

A keyless access system 50 is fitted in relation with the vehicle and its user who carries at least one handheld object 51 such as a microwave badge. The handheld object 51 uses a radiofrequency channel 52 to exchange access control information with an onboard controller 53 on board the vehicle.

When the recognition between the handheld object 51 and the onboard controller 53 is complete, a vehicle access enable signal 54 is sent to a security computer 55 which then triggers the vehicle access actions. These actions are not affected by the present invention.

The security actions carried out by the computer 55 include the activation of the various onboard computers on board the vehicle for managing the various vehicle control resources and operators, and will not be described further.

In particular, such a vehicle of the state of the art comprises a battery 57 which cooperates with a supervisor 58 which sends status information to the various computers on board the vehicle.

On the dashboard of the vehicle in particular, there are control input units such as a pushbutton 59 which serves as a vehicle start and/or stop button.

The start button 59 is connected to the input stage of a start-up computer 60 which interprets the action on the start button 59 so as to provide an activation signal 63 for the various computers of the controlled resources on the vehicle.

In the exemplary embodiment of FIG. 1, three consuming resources are shown which are, respectively, an air-conditioning device 64, a windshield wiper device 68 and a radio set 70.

Each consuming resource is controlled using a computer, 61 for the air conditioning, 67 for the windshield wiper and 69 for the radio set, respectively.

Each computer comprises an input stage referenced "a" which receives in particular a start-up command 63 from the computer 60 managing the start button 59.

It also receives a status signal 62 originating from the power supply supervisor 58.

Obviously, each of the resources is also driven by its own control system which is not shown here, but which finds that the activation of the controlled resource has already taken place simply by actuation of the start button 59.

If, while the button 59 is pressed, the brake pedal F or the clutch pedal E is depressed, then the power train control computer 75 produces a control 76 to start up the power train 77.

Each resource, 64 for the air conditioning, 68 for the windshield wiper, 70 for the radio set or 77 for the power train, is in turn connected to the onboard electrical network 56 to receive the electrical energy that it needs.

Specifically, the input stage a of the computer 75 is connected to the status messaging function of the power supply supervisor 58, on the one hand, and to the control instructions from, respectively, the computer 60 for recognizing the start button 59, the control signal 73 from the computer 71 associated with the brake pedal, and the signal 74 from the computer 72 for recognizing the clutch pedal.

These signals are combined by a specific logic which is expressed here by: control signal 63 AND (control signal 73 OR control signal 74).

Figure 2:
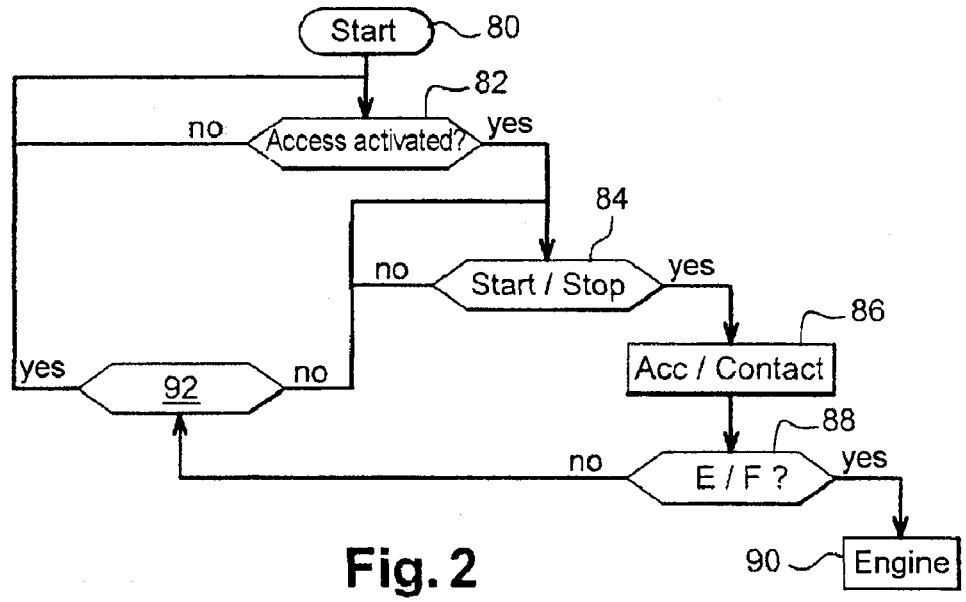

FIG. 2 is a flow diagram of the operation of a control device of the state of the art as represented in FIG. 1.

After a start step 80, a test is run to ascertain whether the keyless access system 50 is activated during a test 82.

The test is repeated as long as the standby status is maintained.

Immediately the keyless access system 50 enables access to the vehicle, the actuation of the start button 59 is tested.

Until the test is positive, it continues to be repeated.

When the test is positive, a sequence is then run which consists in supplying power first to the accessories, then, only in supplying power to the contact, for example, on a second press. This second press can, according to the known embodiments, either give the contact in a hands-free access vehicle or cut off the accessories in other vehicles.

A test is then run, in a step 88, to check whether the clutch pedal or the brake pedal is depressed and, if positive, the power train 90 is started up.

Otherwise, a check is carried out to see if there is a second depression of the start button 59 in a step 92, in which case the method returns to the keyless access system activation test step in the step 82.

If negative, the test of the depression of the start button is recommenced so as to go on to the second step of the so-called "more after contact" transition.

It will be noted that, with this control system of the state of the art, the power is supplied by the onboard network to all the resources of the vehicle immediately the start button is first pressed.

In some top-of-the-range vehicles, the extremely high number of consuming resources can lead to a consumption level of up to 50 amperes.

Moreover, all the computers are thus active in a linked way.

The present invention in fact provides a refinement whereby, on the one hand, resources that are of no use are not powered up and, on the other hand, they are able to be started up independently of each other.

Figure 3:
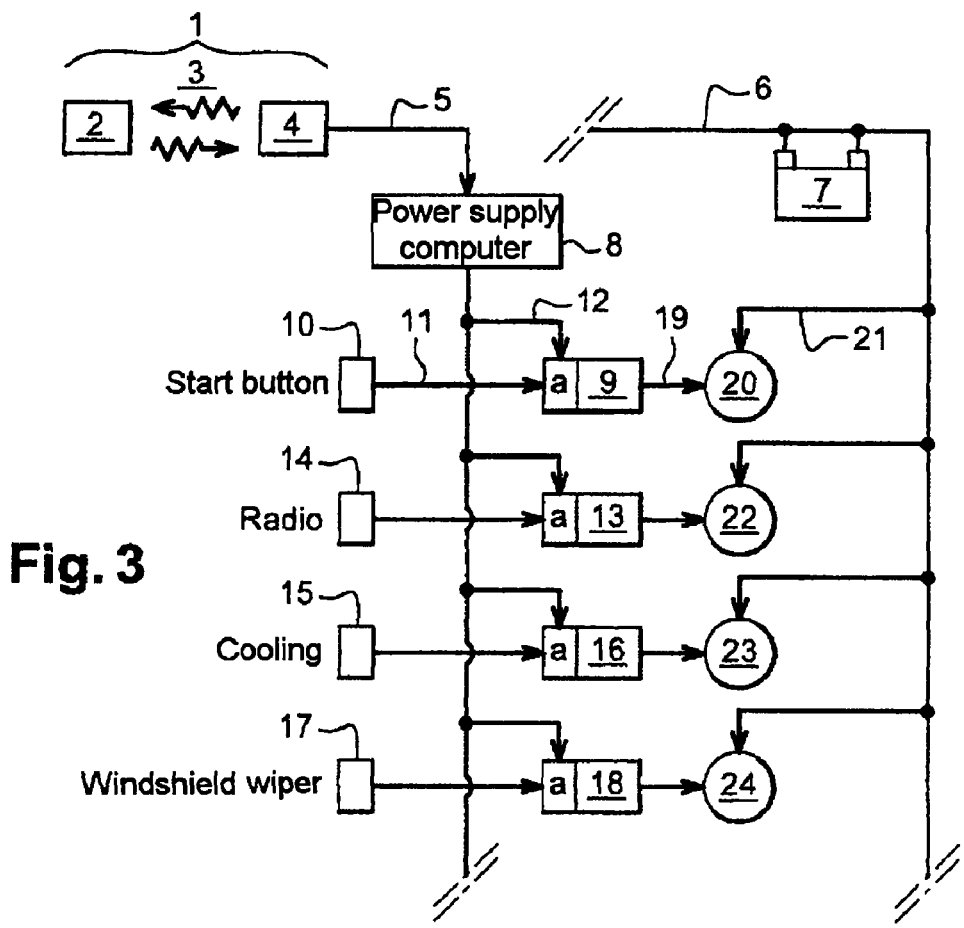
FIG. 3 is a diagram of one particular embodiment of the invention.

FIG. 3 shows an embodiment of a control device according to the invention.

A keyless access system 1 comprises at least one badge 2 worn by a user which uses a radiofrequency channel 3 to exchange a vehicle access signal with a keyless vehicle access controller 4 so that, when the vehicle access recognition has been registered, an authorization signal 5 is transmitted to a computer or power supply supervisor 8.

A battery 7 is connected to the onboard network and can be connected on request to each consuming resource controlled by the vehicle control device.

FIG. 3 shows four consuming resources which are, respectively, the power train 20, the radio set 22, the air conditioning unit 23 and the windshield wiper system 24.

Obviously, other consuming resources are provided according to the vehicle type.

Each resource can be controlled by its own unit for inputting commands or interpreting the wishes of the driver.

To this end, a start button 10 is provided which produces an activation signal connected to an input a of a vehicle start-up computer 9.

Each input stage "a" of the computers 9, 13, 16 and 18 respectively connected to the consuming resources 20, 22, 23 and 24 is connected to a messaging system of the power supply supervisor 8 to provide power supply status information.

Moreover, each effector associated with a resource to be controlled, such as the start button 10, the radio control unit 14, the air conditioning control unit 15 and the windshield wiper system control unit 17 is directly connected to its respective input stage.

In this way, pressing on the start button simply causes the onboard network to be connected to the power train 20 if the control signal 19 is from the computer 9 reading the status of the start button 10.

Similarly, the radio set 22 is connected only from the moment when the radio set control unit is activated whatever the status of the start button and of the other units, and so on.

This provides an assurance that the various controlled resources are, on the one hand, controlled independently of each other and, on the other hand, that they draw energy only when they are actually used.

Specifically, the present invention is applied also if the control unit is not simply available to the user, but is triggered by a call from another resource, such as an onboard computer.

Figure 4:
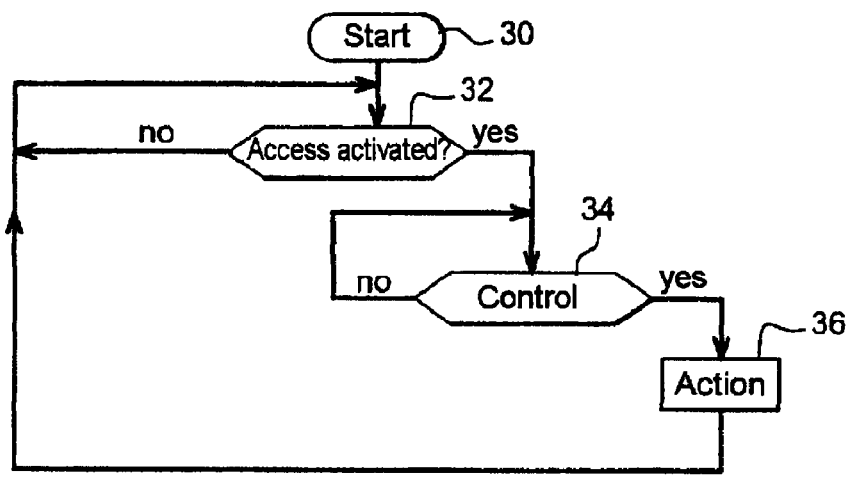
FIG. 4 is a flow diagram repeated for each controlled function in the vehicle.

FIG. 4 is a flow diagram of the operation of each computer associated with a controlled resource as it is represented in the exemplary embodiment of FIG. 3.

After a start step 30, each computer tests whether the keyless access system is still active in a test 32.

If not, the test is repeated. In other embodiments, most of the functions handled by the powered resources require no authentication from the access system badge or card. Only these resources are then enabled after authentication, the others being immediately controllable;

If the test 32 is positive, the activation status of the control unit associated with the resource controlled by the flow diagram is then tested in a step 34.

If the activation test is positive, the resource is then actuated in a step 36, and control returns to the keyless access status test phase 32.

What is claimed is:

1. A vehicle control method, in which vehicle access to the vehicle is controlled by a keyless access system, comprising:

checking starting-up of each electricity-consuming resource of the vehicle by checking a status of a unit for controlling and/or interpreting wishes of the driver, such that each resource associated with a control is independent of the other resources; and then connecting a battery to an onboard network at a request of each controlled consuming resource, such that resources that are not to be used are not powered up.

2. The method as claimed in claim 1, wherein the starting up of at least one electricity-consuming resource is preceded by testing an authorization to access the vehicle.

3. A vehicle control device for a vehicle including a keyless vehicle access controller, comprising, for each electricity-consuming function of the vehicle:

a control unit for entering controls or interpreting wishes of the driver;

a status transition computer for the control unit to call for electrical power from an onboard network, to connect a battery to the onboard network at a request of each controlled consuming resource; and a control actuator or effector responding to the corresponding status transition computer.

* * * * *